(12) United States Patent
Xiao et al.

(10) Patent No.: US 12,487,084 B2
(45) Date of Patent: Dec. 2, 2025

(54) SURFACE FLATNESS DETECTING DEVICE FOR SINGLE CRYSTAL SQUARE ROD

(71) Applicant: TCL ZHONGHUAN RENEWABLE ENERGY TECHNOLOGY CO., LTD., Tianjin (CN)

(72) Inventors: Min Xiao, Tianjin (CN); Youyi Liu, Tianjin (CN); Duoduo Zhang, Tianjin (CN); Zhibing Sun, Tianjin (CN); Zhenyu Zhang, Tianjin (CN); Jiafeng Lu, Tianjin (CN); Junyou Zhang, Tianjin (CN); Kun Wang, Tianjin (CN); Jinlu Shi, Tianjin (CN); Jinxin Yan, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 18/548,094

(22) PCT Filed: Jul. 31, 2023

(86) PCT No.: PCT/CN2023/110381
§ 371 (c)(1),
(2) Date: Aug. 27, 2023

(87) PCT Pub. No.: WO2024/041322
PCT Pub. Date: Feb. 29, 2024

(65) Prior Publication Data
US 2025/0012566 A1 Jan. 9, 2025

(30) Foreign Application Priority Data
Aug. 25, 2022 (CN) .......................... 202222250690.9

(51) Int. Cl.
*G01B 21/30* (2006.01)

(52) U.S. Cl.
CPC .................................... *G01B 21/30* (2013.01)

(58) Field of Classification Search
CPC ..................................................... G01B 21/30
(Continued)

(56) References Cited

FOREIGN PATENT DOCUMENTS

| CN | 101520295 A | * | 9/2009 |
| CN | 102679890 A | * | 9/2012 |

(Continued)

OTHER PUBLICATIONS

International Search Report in International application No. PCT/CN2023/110381, mailed on Nov. 26, 2023.
(Continued)

*Primary Examiner* — Walter L Lindsay, Jr.
*Assistant Examiner* — Warren K Fenwick
(74) *Attorney, Agent, or Firm* — PV IP PC; Wei Te Chung

(57) ABSTRACT

A surface flatness detecting device for single crystal square is provide. The device includes a clamping assembly and a detecting assembly. The clamping assembly has a first clamper and a second clamper, the first clamper and the second clamper are configured to clamp a first end and a second end of the single crystal square rod, respectively. The detecting assembly has a first detector and a second detector, the first detector and the second detector are configured to detect a first side and a second side of the single crystal square rod, respectively. After the first side and the second side are detected by the first detector and the second detector, respectively, the first clamper and the second clamper rotate the single crystal square rod by 90 degrees to detect a third side and a fourth side of the single crystal square rod.

19 Claims, 1 Drawing Sheet

(58) Field of Classification Search
USPC .......................................................... 73/865.8
See application file for complete search history.

(56) References Cited

FOREIGN PATENT DOCUMENTS

| | | | | |
|---|---|---|---|---|
| CN | 102914279 | A | 2/2013 | |
| CN | 106908024 | A | 6/2017 | |
| CN | 106940178 | A * | 7/2017 | ............. G01B 21/30 |
| CN | 207019617 | U | 2/2018 | |
| CN | 108036700 | A * | 5/2018 | ............. G01B 5/245 |
| CN | 108956347 | A | 12/2018 | |
| CN | 208621040 | U | 3/2019 | |
| CN | 208860265 | U * | 5/2019 | |
| CN | 110631519 | A * | 12/2019 | ............. G01B 11/30 |
| CN | 110749301 | A * | 2/2020 | ............. B28D 7/043 |
| CN | 110806166 | A | 2/2020 | |
| CN | 111521103 | A | 8/2020 | |
| CN | 211717366 | U | 10/2020 | |
| CN | 212206003 | U | 12/2020 | |
| CN | 212340154 | U | 1/2021 | |
| CN | 215810643 | U | 2/2022 | |
| CN | 114199165 | A | 3/2022 | |
| CN | 216246066 | U | 4/2022 | |
| CN | 218380947 | U | 1/2023 | |
| JP | H1047949 | A | 2/1998 | |
| JP | 2000258144 | A | 9/2000 | |
| JP | 2003202220 | A | 7/2003 | |
| JP | 2004151102 | A | 5/2004 | |
| WO | WO-2025179421 | A1 * | 9/2025 | |

OTHER PUBLICATIONS

Written Opinion of the International Search Authority in International application No. PCT/CN2023/110381, mailed on Nov. 26, 2023.

* cited by examiner

SURFACE FLATNESS DETECTING DEVICE FOR SINGLE CRYSTAL SQUARE ROD

CROSS-REFERENCE TO RELATED DISCLOSURE

This application claims priority to Chinese Patent Application No. 202222250690.9, filed Aug. 25, 2022, titled "SURFACE FLATNESS DETECTING DEVICE FOR SINGLE CRYSTAL SQUARE ROD", which is incorporated herein by reference in its entirety.

TECHNICAL FIELD

The present disclosure relates to a technical field of a single crystal silicon rod production, and particularly relates to a surface flatness detecting device for single crystal square rod.

BACKGROUND

With production of solar single crystal silicon, a single crystal silicon rod is ground and cut into a single crystal square rod. During machining of the single crystal square rod, a surface may be damaged and uneven. Currently, an inspector uses a vernier caliper to measure a side of the square rod perpendicular to an axis of the square rod to determine a surface flatness of the square rod, or directly observes the square rod with eyes. The current method for measuring has a large error, thus, the accuracy is inaccurate, and subsequent production is not ensured. Moreover, the manual inspection has a low speed, and the work efficiency is low.

SUMMARY

A surface flatness detecting device for single crystal square rod is provided, which effectively solves problems of large manual detection measurement error and low working efficiency.

A surface flatness detecting device for single crystal square rod includes a clamping assembly, wherein the clamping assembly includes a first clamper and a second clamper, the first clamper is disposed at a first end of the single crystal square rod, the second clamper is disposed at a second end of the single crystal square rod, and the first clamper and the second clamper are symmetrically disposed relative to an axis of a width side of the single crystal square rod to clamp the first end and the second end, respectively; and a detecting assembly, wherein the detecting assembly includes a first detector and a second detector, the first detector is disposed on a first side of the single crystal square rod, the second detector is disposed on a second side of the single crystal square rod, and the first detector and the second detector are symmetrically disposed relative to an axis of a length side of the single crystal rod to detect the first side and the second side, respectively; wherein the first clamper and the second clamper rotate the single crystal square rod around the axis of the length side of the single crystal square rod by 90 degrees to detect a third side and a fourth side of the single crystal square rod, after the first side and the second side are detected by the first detector and the second detector, respectively.

In an embodiment, the first clamper and the second clamper each includes a rotating member, a clamping arm is provided on a side of the rotating member close to the single crystal square rod, the clamping arm is configured to clamp the single crystal square rod, and the rotating member is configured to drive the clamping arm to rotate the single crystal square rod around the axis of the length side of the single crystal square rod.

In an embodiment, the clamping arm has a retractable configuration, and the clamping arm is configured to extend and retract along the axis of the length side of the single crystal square rod.

In an embodiment, the first detector and the second detector each includes a telescopic arm, a carrier plate is provided at an end of the telescopic arm close to the single crystal square rod, a plurality of detection probes is provided on a side of the carrier plate close to the single crystal square rod, and the telescopic arm is configured to move the plurality detection probes toward the single crystal square rod.

In an embodiment, the plurality of the detection probes is disposed in at least three non-collinear positions.

In an embodiment, a pressure sensor is provided at an end of each of the plurality of detection probes close to the single crystal square rod, the pressure sensor is configured to determine surface flatness of a side of the single crystal square rod.

In an embodiment, in response to all the detection probes contacting the single crystal square rod, the telescopic arm stops moving the detection probe toward the single crystal square rod, and the surface flatness of the side of the single crystal square rod is determined by a pressure value sensed by the pressure sensor.

In an embodiment, a telescopic member is provided between the detection probe and the carrier plate, and the telescopic member is configured to extend and retract the detection probe.

In an embodiment, in response to all the detection probes contacting the single crystal square rod, the telescopic arm stops moving the detection probe toward the single crystal square rod; in response to the pressure value sensed by the pressure sensor beyond a limit value, the telescopic member moves the detection probe to retract; wherein, the surface flatness is determined by the pressure value sensed by the pressure sensor, provided that the pressure sensor of the detection probe detects the pressure value not beyond the limit value; and the surface flatness is determined by the pressure value sensed by the pressure sensor and a retract amount of the telescopic member, provided that the pressure sensor of the detection probe detects the pressure value beyond the limit value.

In an embodiment, the retract amount is based on a moving speed of the telescopic arm and a retract time of the telescopic member.

In an embodiment, an inductor is provided at an end of each of the plurality of detection probes close to the single crystal square rod, a telescopic member is provided between the detection probe and the carrier plate, and surface flatness of a side of the single crystal square rod is determined by a retract amount or an extend amount of the telescopic member.

In an embodiment, in response to the detection probe sensed to contact the single crystal square rod by the inductor, the telescopic member retracts back; and in response to the detection probe contacting the single crystal square rod, the telescopic arm stops moving the detection probe toward the single crystal square rod, wherein surface flatness is determined by the retract amount of the telescopic member. In an embodiment, the retract amount is based on a moving speed of the telescopic arm and a retract time of the telescopic member.

In an embodiment, in response to one of the detection probes contacting the single crystal square rod, the telescopic arm stop moving the detection probe toward the single crystal square rod, and the telescopic member is continued to extend until contacting the single crystal square rod, wherein surface flatness is determined by the extend amount of the telescopic member. In an embodiment, the extend amount is based on a moving speed of the telescopic arm and an extend time of the telescopic member.

In an embodiment, a supporting plate is provided on a side of the carrier plate close to the single crystal square rod, the supporting plate is arranged parallel to the carrier plate, a plurality of sleeves is provided on the supporting plate, the detection probe extends through a corresponding one of the plurality of sleeves, and the detection probe is movable along the corresponding sleeve to compress the telescopic member until the detection probe is flush with an end face of the corresponding sleeve close to the single crystal square rod.

According to the surface flatness detecting device abovementioned, the surface flatness of the single crystal square rod is automatically measured, a high accuracy on measurement is provided, and work efficiency is improved.

BRIEF DESCRIPTION OF THE DRAWINGS

In order to make the embodiments of the present disclosure or the technical solutions in the prior art more clearly, reference will now be made to the accompanying drawings used in the description of the embodiments or the prior art, and it will be apparent that the accompanying drawings in the description below are merely some of the embodiments of the present disclosure, and other drawings may be made to those skilled in the art without any inventive effort.

REFERENCE NUMERALS

Figure 1:
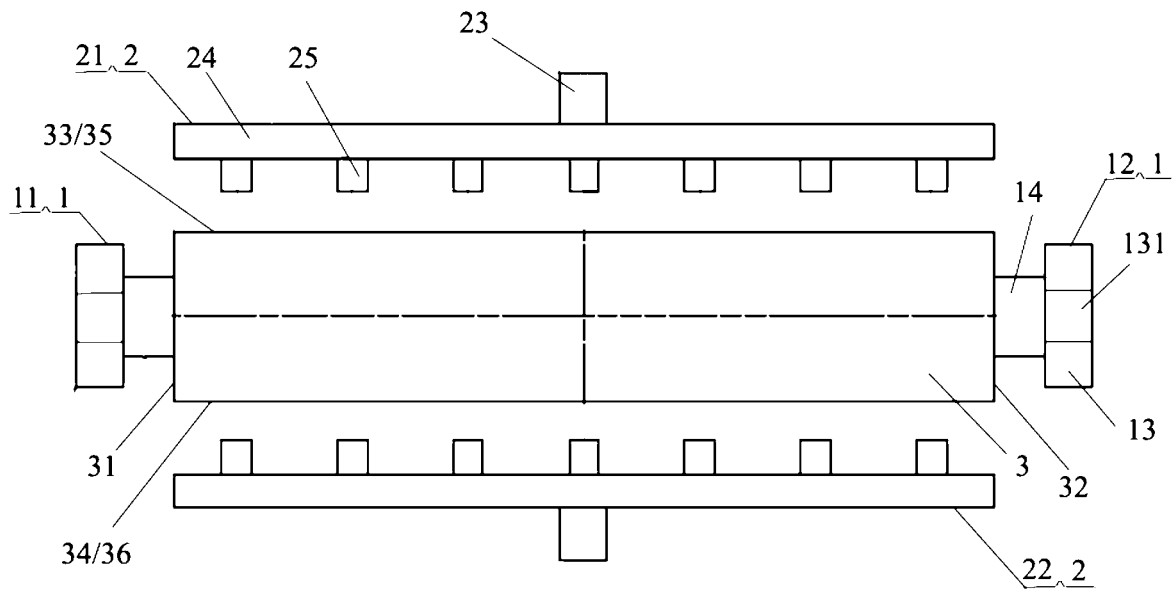
FIG. 1 is a schematic diagram of a surface flatness detecting device for single crystal square rod according to an embodiment of the present disclosure.

| 1. clamping assembly; | 11. first clamper; | 12. second clamper; |
|---|---|---|
| 13. rotating member; | 14. clamping arm; | 131. rotating shaft; |
| 3. single crystal square rod; | 31. first end; | 32. second end; |
| 33. first side; | 34. second side;; | 35. third side; |
| 36. fourth side; | | |
| 2. detecting assembly; | 21. first detector; | 22. second detector; |
| 23. telescopic arm; | 24. carrier plate; | 25. detection probe; |
| 26. telescopic member; | 27. supporting plate; | 28. sleeve; |
| 291. pressure sensor; | 292. inductor. | |

DETAILED DESCRIPTION OF THE EMBODIMENTS

In order that the above objects, features and advantages of the present disclosure may be more readily understood, reference will now be made in detail to the accompanying drawings. In the following description, numerous specific details are set forth in order to facilitate a thorough understanding of the present disclosure. However, the present disclosure can be practiced in many other ways than those described herein, and those skilled in the art can make similar modifications without departing from the spirit of the present disclosure, and thus the present disclosure is not limited to the specific embodiments disclosed below.

In the description of this disclosure, it should be understood that the azimuth or positional relationship indicated by the terms "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential", and the like, is based on the azimuth or positional relationship shown in the accompanying drawings, merely for ease of description of this disclosure and simplification of the description, and is not intended to indicate or imply that the indicated device or element must have a particular azimuth, be constructed and operated in a particular azimuth, and therefore is not to be construed as limiting of this disclosure.

Furthermore, the terms "first" and "second" are used for descriptive purposes only and are not to be construed as indicating or implying relative importance or implying the number of indicated technical features. Thus, the features with "first" and "second" indicate or imply to have at least one of these features. In the description herein, "a plurality of" means at least two, e.g., two, three, etc., unless expressly and specifically defined otherwise.

In the present disclosure, unless expressly defined and defined otherwise, terms such as "mounted", "linked", "connected", "fixed", and the like, should be understood as a border meaning, for example, may be fixedly connection, detachably connection, or a integrally connection; may be a mechanical connection or an electrical connection; may be a directly connection or an indirectly connection by means of an intermediate medium; and may be an internal communication of the two elements or interaction of the two elements, unless expressly defined otherwise. The specific meaning of the above terms in this disclosure may be understood by one of ordinary skill in the art depending on the specific circumstances.

In the present disclosure, unless expressly stated and defined otherwise, the first feature may be "on" or "under" the second feature may mean that the first feature directly contacts with the second feature or indirectly contacts with the second feature through an intermediate medium. And the first feature may be "over", "above" or "up" the second feature may mean that the first feature may be directly above or obliquely above the second feature, or merely indicate that the first feature is higher than the second feature. The first feature may be "beneath", "below" or "down" the second feature may mean that the first feature may be directly above or obliquely under the second feature, or merely indicate that the first feature is shorter than the second feature.

It should be noted that when an element is referred to as being "fixed to" or "disposed in" another element, it means that the element may be directly on another element or an intermediate element may be disposed therebetween. When an element is considered to "be connected to" another element, it means that the element may be directly connected to another element or an intermediate element may be connected therebetween. As used herein, the terms "vertical", "horizontal", "up", "down", "left", "right", and the like are used for purposes of illustration only and are not intended to be the only embodiments.

A surface flatness detecting device for single crystal square rod is provided according to an embodiment of the present disclosure, and the embodiment of the present disclosure is described below with reference to the accompanying drawings.

As shown in FIG. 1, a surface flatness detecting device for single crystal square rod is provided. The surface flatness detecting device includes a clamping assembly 1 and a detecting assembly 2. The single crystal square rod 3 has a first end 31 and a second end 32, wherein the first end 31 and the second end 32 are provided along a length side of the single crystal square rod 3. The single crystal square rod 3 further includes a first side 33, a second side 34, a third side 35, and a fourth side 36. The first side 33, the second side 34, the third side 35, and the fourth side 36 are connected vertically between the first end 31 and the second end 32, respectively. The first side 33, the second side 34, the third side, and the fourth side are connected with each other. The clamping assembly 1 includes a first clamper 11 and a second clamper 12, wherein the first clamper 11 is disposed at the first end 31 of the single crystal square rod 3, the second clamper 12 is disposed at the second end 32 of the single crystal square rod 3, and the first clamper 11 and the second clamper 12 are symmetrically arranged relative to an axis of width side of the single crystal square rod 3. The first end 31 is clamped by the first clamper 11, and the second end 32 is clamped by the second clamper 12. As such, the single crystal square rod 3 is clamped for detection. The detecting assembly 2 includes a first detector 21 and a second detector 22, wherein the first detector 21 is disposed on the first side 33 of the single crystal square rod 3, and the second detector 22 is disposed on the second side 34 of the single crystal square rod 3. The first detector 21 and the second detector 22 are symmetrically arranged relative to an axis of the length side of the single crystal square rod 3. The first detector 21 and the second detector 22 are configured to detect the surface flatness of the first side 33 and the second side 34 of the single crystal square rod 3, respectively. After the surface flatness of the first side 33 and the second side 34 of the single crystal square rod 3 are detected, the clamping assembly 1 rotates the single crystal square rod 3 around the axis of the length side of the single crystal square rod 3 by 90 degrees. At this time, the third side 35 and the fourth side 36 of the single crystal square rod 3 are aligned with the first detector 21 and the second detector 22, respectively. As such, the surface flatness of the third side 35 and the fourth side 36 of the single crystal square rod 3 are detected by the first detector 21 and the second detector 22, respectively. Finally, the surface flatness of the four sides of the single crystal square rod 3 are detected.

In an embodiment, the first clamper 11 and the second clamper 12 each includes a rotating member 13 and a clamping arm 14, wherein the clamping arm 14 is provided on a side of the rotating member 13 close to the single crystal square rod 3. The clamping arm 14 is configured to clamp the first end 31 and the second end 32 of the single crystal square rod 3. The rotating member 13 is configured to rotate the clamping arm 14 and the single crystal square rod 3 around the axis of the length side of the single crystal square rod 3. A rotating shaft 131 is provided at a center of the rotating member 13, and the rotating shaft 131 is connected to a motor which drives the rotating member 13 to rotate around the rotating shaft 131. The rotating shaft 131 is arranged coaxially with the single crystal square rod 3. An end of the clamping arm 14 away from the single crystal square rod 3 is connected to the rotating member 13. After the surface flatness of the first side 33 and the second side 34 of the single crystal square rod 3 are detected, the rotating member 13 is driven by the motor to rotate the clamping arm 14. The single crystal square rod 3 is rotated in clockwise by 90 degrees around the axis of the length side. Then the third side 35 and the fourth side 36 of the single crystal square rod 3 are toward the first detector 21 and the second detector 22, respectively, for detection. Alternatively, the single crystal square rod 3 is rotated in counterclockwise by 90 degrees around the axis of the length side. Then the fourth side 36 and the third side 35 of the single crystal square rod 3 are toward the first detector 21 and the second detector 22, respectively, for detection.

In an embodiment, the clamping arm 14 is in a telescopic configuration, and may be extended or retracted in the axis of the length side of the single crystal square rod 3. As the lengths of different single crystal square rods 3 may be different, the clamping arm 14 is provided in a telescopic configuration for facilitating to grip and clamp the single crystal square rod 3. In a case that the single crystal square rod 3 is long, the clamping arm 14 is retracted to a short length, and in a case that the single crystal square rod 3 is short, the clamping arm 14 is extended to a long length. The clamping arm 14 may be an electric telescopic rod or a cylinder.

In an embodiment, the first detector 21 and the second detector 22 each includes a telescopic arm 23, and an end of the telescopic arm 23 close to the single crystal square rod 3 is provided with a carrier plate 24. The carrier plate 24 is arranged parallel to the length side of the single crystal square rod 3. A plurality of detection probes 25 is disposed on a side of the carrier plate 24 close to the single crystal square rod 3. The telescopic arm 23 moves the carrier plate 24 and the detection probes 25 toward the single crystal square rod 3. The telescopic arm 23 may be an electric telescopic rod or cylinder. To detect the surface flatness more accurate, the size and shape of the carrier plate 24 corresponds to each of the four sides of the single crystal square rod 3.

In an embodiment, the detection probes 25 are provided in at least three non-collinear positions. For a more effectively detection on the surface flatness of the single crystal square rod 3, the detection probes 25 are provided vertically to the length side of the single crystal square rod 3. The detection probes 25 are dispersed on the carrier plate 24. The more the number of the detection probes 25 is provided, the more uniform the detection probes 25 are distributed, and the more accurate the surface flatness is measured.

In an embodiment, a plurality of pressure sensors 291 is provided. Each of the pressure sensors 291 is disposed at an end of a corresponding one of the detection probes 25 close to the single crystal square rod 3. In a case that all the detection probes 25 are in contact with the side (first side, second side, third side or fourth side) of the single crystal square rod 3, the pressure sensors sense different pressure values due to uneven surfaces of the single crystal square rod 3. As such, the surface flatness of the side of the single crystal square rod 3 is determined by the pressure value sensed by the pressure sensor 291.

Figure 2:
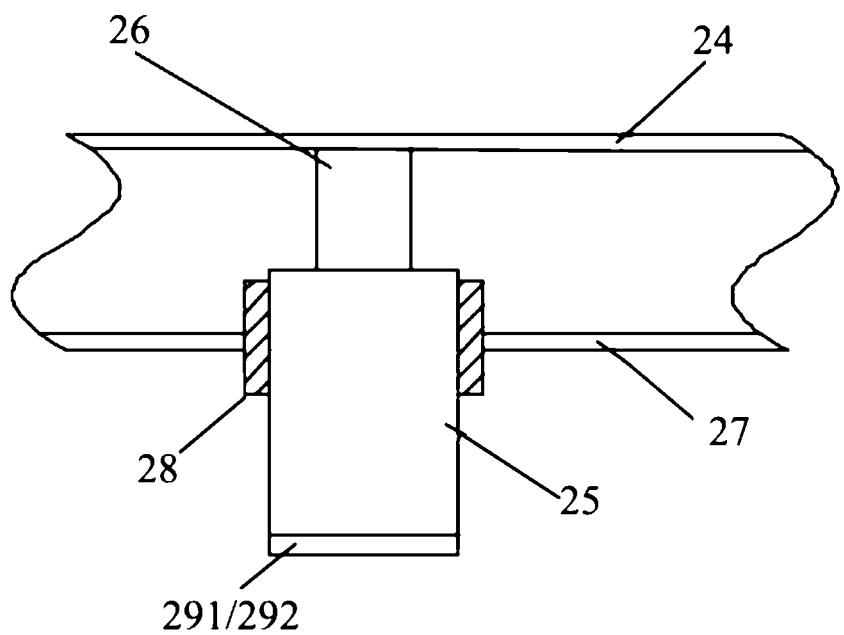
FIG. 2 is a schematic diagram of a connection of a detection probe a surface flatness detecting device for single crystal square rod according to an embodiment of the present disclosure.

In an embodiment, as shown in FIG. 2, to prevent the pressure sensor 291 from being damaged due to the pressure value exceeding a limit value, a telescopic member 26 is provided at an end of the detection probe 25 connected to the carrier plate 24. In a case that the pressure value sensed by the pressure sensor 291 exceeds the limit value, the telescopic member 26 retracts to move the detection probe 25 and the pressure sensor 291 back, and to prevent the pressure sensor 291 from being damaged. The telescopic member 26 may be an electric telescopic rod or a cylinder.

In an embodiment, as shown in FIG. 2, an inductor 292 is provided at an end of the detection probe 25 close to the single crystal square rod 3, and is configured to sense the detection probe 25 in contact with the single crystal square rod 3. A telescopic member 26 is provided at end of the detection probe 25 connected to the carrier plate 24. The telescopic arm 23 moves the detection probes 25 and the inductor 292 toward the single crystal square rod 3. The surface flatness of the single crystal square rod 3 is determined by the extend amount or the retract amount of the telescopic member 26. The telescopic member 26 may be an electric telescopic rod or a cylinder.

In an embodiment, as shown in FIG. 2, a supporting plate 27 is fixed to a side of the carrier plate 24 close to the single crystal square rod 3, and the supporting plate 27 is disposed parallel to the carrier plate 24. A plurality of sleeves 28 is mounted on the supporting plate 27, and the sleeves 28 are disposed perpendicular to the supporting plate 27. The detection probe 25 extends through a corresponding one of the sleeves 28, and the detection probe 25 is movable along the corresponding sleeve 28. In a case that the detection probe 25 is moved back to a large extent, the detection probe 25 is retracted into the sleeve 28 and is flush with the corresponding sleeve 28. The sleeve 28 is prevented the detection probe 25 from being further retracted, and the pressure sensor 291 or the inductor 292 on the detection probe 25 are effectively protected.

Example 1

As shown in FIG. 1, a surface flatness detecting device for single crystal square rod includes a clamping assembly 1 and a detecting assembly 2. The single crystal square rod 3 has a first end 31 and a second end 32, wherein the first end 31 and the second end 32 are provided along a length side of the single crystal square rod 3. The single crystal square rod 3 further includes a first side 33, a second side 34, a third side, and a fourth side. The first side 33, the second side 34, the third side 35, and the fourth side 36 are connected vertically between the first end 31 and the second end 32. The first side 33, the second side 34, the third side 35, and the fourth side 36 are connected with each other. The clamping assembly 1 includes a first clamper 11 and a second clamper 12, wherein the first clamper 11 is disposed at the first end 31 of the single crystal square rod 3, the second clamper 12 is disposed at the second end 32 of the single crystal square rod 3, and the first clamper 11 and the second clamper 12 are symmetrically arranged relative to an axis of a width side of the single crystal square rod 3. The first end 31 is clamped by the first clamper 11, and the second end 32 is clamped by the second clamper 12. As such, the single crystal square rod 3 is clamped for detection. The detecting assembly 2 includes a first detector 21 and a second detector 22, wherein the first detector 21 disposed at the first side 33, and the second detector 22 is disposed at the second side 34. The first detector 21 and the second detector 22 are symmetrically arranged relative to an axis of the length side of the single crystal square rod 3. The first detector 21 and the second detector 22 are configured to detect the surface flatness of the first side 33 and the second side 34 of the single crystal square rod 3, respectively. The first clamper 11 and the second clamper 12 each includes a rotating member 13, and a clamping arm 14 is provided on a side of the rotating member 12 close to the single crystal square rod 3. A rotating shaft 131 is provided at a center of the rotating member 13, and the rotating shaft 131 is connected to a motor which drives the rotating member 13 to rotate around the rotating shaft 131. The rotating shaft 131 is arranged coaxially with the single crystal square rod 3. An end of the clamping arm 14 away from the single crystal square rod 3 is connected to the rotating member 13. After the surface flatness of the first side 33 and the second side 34 of the single crystal square rod 3 are detected, the rotating member 13 is driven by the motor to rotate the clamping arm 14. The single crystal square rod 3 is rotated by 90 degrees around the axis of the length side. Then the third side 35 and the fourth side 36 of the single crystal square rod 3 are toward the first detector 21 and the second detector 22, respectively, for detection. In the present embodiment, the clamping arm 14 is an electric telescopic rod, which is telescopic along the axis of the length side of the single crystal square rod 3.

The first detector 21 and the second detector 22 each includes a telescopic arm 23, and an end of the telescopic arm 23 close to the single crystal square rod 3 is provided with a carrier plate 24. The carrier plate 24 is arranged parallel to the length side of the single crystal square rod 3. A plurality of detection probes 25 is disposed on a side of the carrier plate 24 close to the single crystal square rod 3, and the detection probes 25 are perpendicular to the carrier plate 24. In the present embodiment, the telescopic arm 23 is an electric telescopic rod. The shape and size of the carrier plate 24 are as same as the shape and size of each of the sides of the single crystal square rod 3. The detection probes 25 are uniformly distributed on the carrier plate 24. A pressure sensor 291 is provided at an end of each of the detection probes 25 close to the single crystal square rod 3.

The clamping arm 14 of the first clamper 11 and the clamping 14 of the second clamper clamp the first end 31 and the second end 32 of the single crystal square rod 3, respectively. The rotating member 13 rotates to align the first side 33 and the second side 34 of the single crystal square rod 3 with the first detector 21 and the second detector 22, respectively. The telescopic arm 23 moves the detection probes 25 toward the single crystal square rod 3. When all the detection probes 25 contact the surface of the single crystal square rod 3, the telescopic arm 23 stops moving, and the surface flatness of the first side 33 and the second side 34 of the single crystal square rod 3 is determined by the pressure values sensed by the pressure sensors. After detecting the surface flatness of the first side 33 and the second side 34, the rotating member 13 rotates the single crystal square rod 3 around the axis of the length side by 90 degrees to detect the surface flatness of the third side 35 and the fourth side 36.

Example 2

As shown in FIG. 2, a difference from Example 1 lies in that a telescopic member 26 is connected between the carrier plate 24 and at an end of each of the detection probes 25 connected to the carrier plate 24, and in the present embodiment, the telescopic member 26 is an electric telescopic rod. A supporting plate 27 is fixed to a side of the carrier plate 24 close to the single crystal square rod 3, and the supporting plate 27 is disposed parallel to the carrier plate 24. A plurality of sleeves 28 is mounted on the supporting plate 27, and the sleeves 28 are disposed perpendicular to the supporting plate 27. The detection probe 25 extends through a corresponding one of the sleeves 28. The telescopic member 26 extends and retracts to move the detection probe 25 along the sleeve 28 forward and back. In a case that the detection probe 25 is moved back to a larger extent, the detection probe 25 is retracted into the sleeve 28 and is flush with the sleeve 28. The sleeve 28 is prevented the detection probe 25 from being further retracted, and the pressure sensor 291 on the detection probe 25 is effectively protected.

In contrast to Example 1, the telescopic arm 23 needs to be moved at a certain speed. When all the detection probes 25 contact the surface of the single crystal square rod 3, the telescopic arm 23 stops moving. In movement of the detection probes 25, when the pressure sensed by the pressure sensor reaches the limit value, the telescopic member 26 starts to retract and the timer starts. At the same time, a part of the pressure sensors 291 detects the pressure values beyond the limit value, whereas another part of the pressure sensors 291 detects the pressure values not beyond the limit value. In response to the pressure sensor 291 of detection probe 25 detecting the pressure value not beyond the limit value, the surface flatness is determined by the pressure value sensed by the pressure sensor 291, and in response to the pressure sensor 291 of detection probe 25 detecting the pressure value beyond the limit value, the surface flatness is determined by the pressure value sensed by the pressure sensor 291 and the retract amount of the corresponding telescopic member 26. The retract amount of the telescopic member 26 is determined by the moving speed of the telescopic arm 23 and the retract time of the telescopic member 26. The retract time is determined by the timer.

Example 3

A difference from Example 1 lies in that an end of the detection probe 25 close to the single crystal square rod 3 is provided with not a pressure sensor 291 but an inductor 292, and a telescopic member 26 is provided at an end of the detection probe 25 connected to the carrier plate 24. In the present embodiment, the telescopic member 26 is an electric telescopic rod.

The clamping arm 14 of the first clamper 11 and the clamping 14 of the second clamper clamp the first end 31 and the second end 32 of the single crystal square rod 3, respectively. The rotating member 13 rotates to align the first side 33 and the second side 34 of the single crystal square rod 3 with the first detector 21 and the second detector 22, respectively. The telescopic arm 23 moves the detection probes 25 and the inductor 292 toward the single crystal square rod 3 at a certain speed, the inductor 292 starts timing when the detection probe 25 contact the surface of the single crystal square rod 3. When all the detection probes 25 contact the single crystal square rod 3, the telescopic arm 23 stops moving. During movement of the detection probes 25, when the detection probe 25 contacts the surface of the single crystal square rod 3, the telescopic member 26 start to retract. The surface flatness of the single crystal square rod 3 is determined by the retract amount of the telescopic members 26. The retract amount of the telescopic member 26 is determined by the moving speed of the telescopic arm 23 and the retract time of the telescopic member 26. After detecting the surface flatness of the first side 33 and the second side 34, the rotating member 13 rotates the single crystal square rod 3 around the length side by 90 degrees to detect the surface flatness of the third side 35 and the fourth side 36.

Example 4

A difference from Example 3 lies in that a supporting plate 27 is provided on a side of the carrier plate 24 close to the single crystal square rod 3, and the supporting plate 27 is arranged parallel to the carrier plate 24. A plurality of sleeves 28 is mounted on the supporting plate 27, and the sleeves 28 are arranged perpendicular to the supporting plate 27. The detection probe 25 extends through a corresponding one of the sleeves 28. The telescopic member 26 extends and retracts to move the detection probe 25 along the sleeve 28 forward and back. In a case that the detection probe 25 is retracted to a large extent, the detection probe 25 is retracted into the corresponding sleeve 28 and is flush with the corresponding sleeve 28. The sleeve 28 prevents the detection probe 25 from further retracting, thereby effectively protecting the inductor 292 placed on the detection probe 25.

Example 5

A difference from Example 1 lies in that an end of the detection probe 25 close to the single crystal square rod 3 is provided with not a pressure sensor 291 but an inductor 292, and a telescopic member 26 is provided at an end of the detection probe 25 connected to the carrier plate 24. In the present embodiment, the telescopic member 26 is an electric telescopic rod.

The clamping arm 14 of the first clamper 11 and the clamping 14 of the second clamper clamp the first end 31 and the second end 32 of the single crystal square rod 3, respectively. The rotating member 13 rotates to align the first side 33 and the second side 34 of the single crystal square rod 3 with the first detector 21 and the second detector 22, respectively. The telescopic arm 23 moves the detection probes 25 and the inductor 292 toward the single crystal square rod 3. When the inductor 292 senses that one detection probe 25 contacts the single crystal square rod 3, the telescopic arm 23 stops moving. At this time, the telescopic members 26 of the other detection probes 25 are continued to extend at a certain speed, and the timer starts. When the inductors 292 on the other detection probes 25 sense that the other detection probes 25 contact the single crystal square rod 3, the telescopic members 26 corresponding to the other detection probes 25 stop moving and extending. The surface flatness is determined by the extend amount of the telescopic member 26, an the extend amount of the telescopic member 26 is determined by the moving speed of the telescopic arm 23 and the extend time of the telescopic member 26.

The embodiments of the present disclosure have been described in detail above, but the description is only a preferred embodiment of the present disclosure and should not be considered as limiting the scope of implementation of the present disclosure. All equivalents and modifications made in accordance with the scope of the present disclosure is within the scope of the patent of the present disclosure.

What is claimed is:

1. A surface flatness detecting device for single crystal square rod, comprising:
   a clamping assembly, wherein the clamping assembly comprises a first clamper and a second clamper, the first clamper is disposed at a first end of the single crystal square rod, the second clamper is disposed at a second end of the single crystal square rod, and the first clamper and the second clamper are symmetrically disposed relative to an axis of a width side of the single crystal square rod to clamp the first end and the second end, respectively; and
   a detecting assembly, wherein the detecting assembly comprises a first detector and a second detector, the first detector is disposed on a first side of the single crystal square rod, the second detector is disposed on a second side of the single crystal square rod, and the first detector and the second detector are symmetrically disposed relative to an axis of a length side of the single crystal rod to detect the first side and the second side, respectively;

wherein the first clamper and the second clamper rotate the single crystal square rod around the axis of the length side of the single crystal square rod by 90 degrees to detect a third side and a fourth side of the single crystal square rod, after the first side and the second side are detected by the first detector and the second detector, respectively.

2. The surface flatness detecting device for single crystal square rod of claim 1, wherein the first clamper and the second clamper each comprises a rotating member, a clamping arm is provided on a side of the rotating member close to the single crystal square rod, the clamping arm is configured to clamp the single crystal square rod, and the rotating member is configured to drive the clamping arm to rotate the single crystal square rod around the axis of the length side of the single crystal square rod.

3. The surface flatness detecting device for single crystal square rod of claim 2, wherein the first detector and the second detector each comprises a telescopic arm, a carrier plate is provided at an end of the telescopic arm close to the single crystal square rod, a plurality of detection probes is provided on a side of the carrier plate close to the single crystal square rod, and the telescopic arm is configured to move the plurality detection probes toward the single crystal square rod.

4. The surface flatness detecting device for single crystal square rod of claim 2, wherein the clamping arm has a retractable configuration, and the clamping arm is configured to extend and retract along the axis of the length side of the single crystal square rod.

5. The surface flatness detecting device for single crystal square rod of claim 4, wherein the first detector and the second detector each comprises a telescopic arm, a carrier plate is provided at an end of the telescopic arm close to the single crystal square rod, a plurality of detection probes is provided on a side of the carrier plate close to the single crystal square rod, and the telescopic arm is configured to move the plurality detection probes toward the single crystal square rod.

6. The surface flatness detecting device for single crystal square rod of claim 1, wherein the first detector and the second detector each comprises a telescopic arm, a carrier plate is provided at an end of the telescopic arm close to the single crystal square rod, a plurality of detection probes is provided on a side of the carrier plate close to the single crystal square rod, and the telescopic arm is configured to move the plurality detection probes toward the single crystal square rod.

7. The surface flatness detecting device for single crystal square rod of claim 6, wherein the plurality of the detection probes is disposed in at least three non-collinear positions.

8. The surface flatness detecting device for single crystal square rod of claim 6, wherein a pressure sensor is provided at an end of each of the plurality of detection probes close to the single crystal square rod, the pressure sensor is configured to determine surface flatness of a side of the single crystal square rod.

9. The surface flatness detecting device for single crystal square rod of claim 8, wherein, in response to all the detection probes contacting the single crystal square rod, the telescopic arm stops moving the detection probe toward the single crystal square rod, and the surface flatness of the side of the single crystal square rod is determined by a pressure value sensed by the pressure sensor.

10. The surface flatness detecting device for single crystal square rod of claim 8, wherein a telescopic member is provided between the detection probe and the carrier plate, and the telescopic member is configured to extend and retract the detection probe.

11. The surface flatness detecting device for single crystal square rod of claim 10, wherein, in response to all the detection probes contacting the single crystal square rod, the telescopic arm stops moving the detection probe toward the single crystal square rod; in response to the pressure value sensed by the pressure sensor beyond a limit value, the telescopic member moves the detection probe to retract;

wherein, the surface flatness is determined by the pressure value sensed by the pressure sensor, provided that the pressure sensor of the detection probe detects the pressure value not beyond the limit value; and the surface flatness is determined by the pressure value sensed by the pressure sensor and a retract amount of the telescopic member, provided that the pressure sensor of the detection probe detects the pressure value beyond the limit value.

12. The surface flatness detecting device for single crystal square rod of claim 11, wherein the retract amount is based on a moving speed of the telescopic arm and a retract time of the telescopic member.

13. The surface flatness detecting device for single crystal square rod of claim 8, wherein a supporting plate is provided on a side of the carrier plate close to the single crystal square rod, the supporting plate is arranged parallel to the carrier plate, a plurality of sleeves is provided on the supporting plate, the detection probe extends through a corresponding one of the plurality of sleeves, and the detection probe is movable along the corresponding sleeve to compress the telescopic member until the detection probe is flush with an end face of the corresponding sleeve close to the single crystal square rod.

14. The surface flatness detecting device for single crystal square rod of claim 6, wherein an inductor is provided at an end of each of the plurality of detection probes close to the single crystal square rod, a telescopic member is provided between the detection probe and the carrier plate, and surface flatness of a side of the single crystal square rod is determined by a retract amount or an extend amount of the telescopic member.

15. The surface flatness detecting device for single crystal square rod of claim 14, wherein, in response to the detection probe sensed to contact the single crystal square rod by the inductor, the telescopic member retracts back; and in response to the detection probe contacting the single crystal square rod, the telescopic arm stops moving the detection probe toward the single crystal square rod, wherein surface flatness is determined by the retract amount of the telescopic member.

16. The surface flatness detecting device for single crystal square rod of claim 15, wherein the retract amount is based on a moving speed of the telescopic arm and a retract time of the telescopic member.

17. The surface flatness detecting device for single crystal square rod of claim 14, wherein, in response to one of the detection probes contacting the single crystal square rod, the telescopic arm stop moving the detection probe toward the single crystal square rod, and the telescopic member is continued to extend until contacting the single crystal square rod, wherein surface flatness is determined by the extend amount of the telescopic member.

18. The surface flatness detecting device for single crystal square rod of claim 17, wherein the extend amount is based on a moving speed of the telescopic arm and an extend time of the telescopic member.

19. The surface flatness detecting device for single crystal square rod of claim 14, wherein a supporting plate is provided on a side of the carrier plate closet to the single crystal square rod, the supporting plate is arranged parallel to the carrier plate, a plurality of sleeves is provided on the supporting plate, the detection probe extends through a corresponding one of the plurality of sleeves, and the detection probe is movable along the corresponding sleeve to compress the telescopic member until the detection probe is flush with an end face of the corresponding sleeve close to the single crystal square rod.

\* \* \* \* \*